United States Patent
Hosom et al.

(10) Patent No.: US 10,248,770 B2
(45) Date of Patent: Apr. 2, 2019

(54) UNOBTRUSIVE VERIFICATION OF USER IDENTITY

(71) Applicant: Sensory, Incorporated, Santa Clara, CA (US)

(72) Inventors: John-Paul Hosom, Portland, OR (US); Todd F. Mozer, Los Altos Hills, CA (US); Pieter J. Vermeulen, Portland, OR (US); Bryan L. Pellom, Erie, CO (US)

(73) Assignee: Sensory, Incorporated, Santa Clara, CA (US)

( * ) Notice: Subject to any disclaimer, the term of this patent is extended or adjusted under 35 U.S.C. 154(b) by 57 days.

(21) Appl. No.: 14/450,528

(22) Filed: Aug. 4, 2014

(65) Prior Publication Data

US 2015/0261944 A1    Sep. 17, 2015

Related U.S. Application Data

(60) Provisional application No. 61/954,388, filed on Mar. 17, 2014.

(51) Int. Cl.
*G06F 21/32* (2013.01)
(52) U.S. Cl.
CPC ...... *G06F 21/32* (2013.01); *G06F 2221/2111* (2013.01); *G06F 2221/2117* (2013.01)
(58) Field of Classification Search
CPC .............................. G06F 21/31; G06F 21/316
See application file for complete search history.

(56) References Cited

U.S. PATENT DOCUMENTS

| | | | | |
|---|---|---|---|---|
| 4,805,222 | A * | 2/1989 | Young | G06F 21/316 340/5.51 |
| 6,311,272 | B1 * | 10/2001 | Gressel | G06K 9/0085 380/258 |
| 6,421,453 | B1 * | 7/2002 | Kanevsky | G06F 21/316 340/5.2 |
| 2004/0059950 | A1 * | 3/2004 | Bender | G06F 21/316 726/5 |
| 2007/0177773 | A1 | 8/2007 | Hu et al. | |
| 2008/0011825 | A1 | 1/2008 | Giordano et al. | |
| 2008/0201579 | A1 | 8/2008 | Whillock | |
| 2009/0320123 | A1 * | 12/2009 | Yu et al. | 726/16 |
| 2010/0144315 | A1 * | 6/2010 | Jayasuriya et al. | 455/411 |

(Continued)

OTHER PUBLICATIONS

Yampolskiy et al., "Direct and Indirect Human Computer Interaction Based Biometrics" Dec. 2007, Journal of Computers, Journal of Computers, vol. 2, No. 10 (2007), doi:10.4304/jcp.2.10.76-88, pp. 76-88.*

(Continued)

*Primary Examiner* — Harunur Rashid
(74) *Attorney, Agent, or Firm* — Fountainhead Law Group P.C.

(57) ABSTRACT

Techniques for unobtrusively verifying the identity of a user of a computing device are provided. In one embodiment, the computing device can establish one or more verification models for verifying the user's identity, where at least a subset of the one or more verification models is based on enrollment data that is collected in an unobtrusive manner from the user. The computing device can then verify the user's identity using the one or more verification models.

13 Claims, 8 Drawing Sheets

(56) References Cited

U.S. PATENT DOCUMENTS

| | | | | |
|---|---|---|---|---|
| 2012/0252411 | A1* | 10/2012 | Johnsgard | G07C 9/00158 455/411 |
| 2013/0191908 | A1* | 7/2013 | Klein | 726/18 |
| 2013/0290136 | A1* | 10/2013 | Sheets | G06Q 30/0609 705/26.35 |
| 2014/0289819 | A1* | 9/2014 | Lindemann | G06Q 20/42 726/5 |
| 2014/0289820 | A1* | 9/2014 | Lindemann | G06Q 20/42 726/5 |
| 2014/0354401 | A1* | 12/2014 | Soni | G07C 9/00158 340/5.52 |

OTHER PUBLICATIONS

Pusara et al., "User ReAuthentication via Mouse Movements" Oct. 29, 2004; ACM 1581139748/ 04/0010,VizSEC/DMSEC'04, Washington, DC, USA; pp. 1-8.*

Mustafić, et al.,. "Behavioral biometrics for persistent single sign-on." In Proceedings of the 7th ACM workshop on Digital identity management, . ACM, 2011, pp. 73-82.*

Damousis et al., "Unobtrusive Multimodal Biometric Authentication: The HUMABIO Project Concept" Hindawi Publishing Corporation, EURASIP Journal on Advances in Signal Processing, vol. 2008, Article ID 265767, pp. 1-11.*

De Oliveira et al., "A Security API for Multimodal Multi-biometric Continuous Authentication" 2011 Seventh International Conference on Computational Intelligence and Security, 978-0-7695-4584-4/11 $26.00 © 2011 IEEE, pp. 988-992.*

Derawi, "Smartphones and Biometrics" Gait and Activity Recognition / Mohammad Omar Derawi, Doctoral Dissertations at Gjøvik University College Mar. 2012, ISBN: 978-82-93269-05-2, ISSN: 1893-1227, p. 1-233.*

Azzini el al., "A fuzzy approach to multimodal biometric continuous authentication" Published online: Jun. 28, 2008, Springer Science+ Business Media, LLC 2008, DOI 10.1007/s10700-008-9034-1 pp. 243-256.*

International Search Report and Written Opinion for International Appln. No. PCT/US2015/020751 dated May 29, 2015, 10 pages.

* cited by examiner

UNOBTRUSIVE VERIFICATION OF USER IDENTITY

CROSS REFERENCES TO RELATED APPLICATIONS

The present application claims the benefit and priority under 35 U.S.C. 119(e) of U.S. Provisional Application No. 61/954,388, filed Mar. 17, 2014, entitled "CONTINUOUS TRACKING OF USER IDENTITY." The entire contents of this provisional application are incorporated herein by reference for all purposes.

BACKGROUND

As mobile devices like cellular phones have evolved into capable computing platforms, it has become increasingly common for end-users to perform important tasks (e.g., banking, online purchases, etc.) and/or store sensitive information (e.g., passwords, credit card numbers, email, work documents, etc.) on such devices. This trend has given rise to the need for mobile devices to implement user verification techniques—in other words, techniques that verify the identities of device users in order to, e.g., regulate the tasks the users can perform or the data they can access.

Existing mobile devices support a relatively simple user verification paradigm in which a user first enrolls his/her identity by supplying a predefined type of security metadata to his/her device, such a password, a PIN, a line pattern, a fingerprint, a text-dependent voice sample, or the like. Then, when the user wishes to perform a secured action, the mobile device asks the user to provide the same security metadata supplied at the time of enrollment, and attempts to match the provided metadata with the enrolled metadata. If a match is made the action is allowed, and if a match is not made the action is disallowed.

While the foregoing approach is functional, it also suffers from a number of drawbacks. First, since the user is required to explicitly provide his/her security metadata each time he/she wishes to be verified, the verification process can become burdensome for the user over time, particularly if the user needs to provide such metadata on a regular basis. This also means that, from a practical perspective, user verification cannot be performed continuously in the background (e.g., once every X minutes or hours, in order to ensure the device has not been stolen or otherwise compromised).

Second, since the approach above relies on a single type of verification model at a time, the verification may fail (e.g., return a false negative or a false positive) in certain contexts. For example, a vision-based face verification model may not work well in low light, or speech-based speaker verification model may not work well in a noisy environment. This, in turn, may reduce the user's confidence in, and likelihood to enable/use, the verification system.

SUMMARY

Techniques for unobtrusively verifying the identity of a user of a computing device are provided. In one embodiment, the computing device can establish one or more verification models for verifying the user's identity, where at least a subset of the one or more verification models is based on enrollment data that is collected in an unobtrusive manner from the user. The computing device can then verify the user's identity using the one or more verification models.

A further understanding of the nature and advantages of the embodiments disclosed herein can be realized by reference to the remaining portions of the specification and the attached drawings.

DETAILED DESCRIPTION

Figure 1:
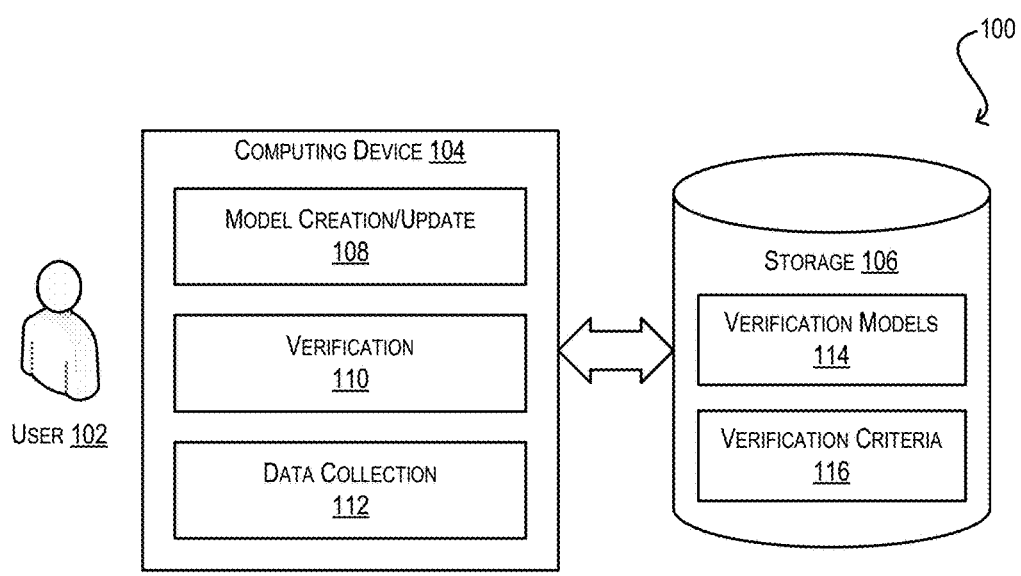
FIG. 1 depicts a block diagram of a system environment that supports unobtrusive user verification according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that enable a computing device (e.g., a smartphone, tablet, etc.) to unobtrusively verify the identity of a user of the device. In one embodiment, the computing device can create an initial verification model for the user, such as a speech-based speaker verification model, a vision-based face verification model, a fingerprint verification model, or the like. The initial verification model can be created explicitly (e.g., via a structured enrollment process) or implicitly (e.g., via user clustering algorithms applied during normal device usage).

The computing device can further identify reliable data streams associated with the user (where a "reliable" data stream is a data stream that is highly correlated with the verified/identified presence of the user), and can use the reliable data streams to unobtrusively update the initial verification model and/or create or update additional verification models. For example, assume the initial verification model is a speech-based, text-dependent speaker verification model that is created via an enrollment process that requires the user to say a specific phrase. In this scenario, the computing device can discreetly capture speech immediately following the enrollment process (which is highly likely to originate from the same user) in order to create an additional, text-independent speaker verification model for the user. Alternatively, the computing device can discreetly capture images of the user's face as he/she is saying the enrollment phrase in order to create an additional, vision-based face verification model for the user.

Then, when the computing device determines that the identity of the user should be verified, the computing device can use the foregoing verification model(s) to unobtrusively verify the user's identity. For instance, if the computing device has created a text-independent speaker verification model and a face verification model for the user, the computing device can, at the time of verification, discreetly collect a speech sample from the user and a photo of the user's face (without requirement explicit user input or action). The computing device can subsequently apply the speech sample and the photo to the speaker and face verification models respectively in order to verify the user.

In various embodiments, the steps of identifying reliable data streams and unobtrusively creating additional verification models and/or updating existing verification models can be repeated on a periodic basis as the user normally interacts with the device. In this way, the accuracy of the verification system can improve over time. In addition, the step of unobtrusively verifying the user can be performed in response to a particular event (e.g., a user request to perform an action) or periodically in the background.

The user verification techniques described herein provide a number of advantages over prior art approaches. First, since the verification process is transparent to the user (i.e., the user does not need to provide any explicit verification input, and may not even be aware that he/she is being verified), the user's experience of interacting with the device is streamlined and simplified. This can be particularly beneficial if the user performs actions that require verification on a regular basis (e.g., launching a banking application, making online purchases, etc.).

Second, since the techniques described herein can establish and apply multiple verification models per user (which are created unobtrusively from reliable data streams, rather than via structured enrollment), the overall accuracy of the verification system can be superior to approaches that rely on a single verification model. For instance, returning to the example above, assume that the computing device has created a text-independent speaker verification model and a face verification model for a user. If, at the time of verification, the user's environment is too noisy to reliably verify the user's identity via the speaker verification model, the computing device can more heavily weigh the results of the face verification model. Conversely, if the user's environment is too dark to reliably verify the user's identity via the face verification model, the computing device can more heavily weigh the results of the speaker verification model. All of this can be performed transparently, without any user intervention. Note that the speaker and face verification models are provided as illustrative examples, and that any other types of verification models may be supported (e.g., fingerprint, retina, handprint, geo-location, device motion, etc.).

Third, since these techniques allow user verification to be performed continuously as a background process (e.g., once every X minutes or hours), these techniques can deter theft of mobile/handheld computing devices such as smartphones, tablets, and the like.

In certain embodiments, the step of verifying a user may be based on a verification score threshold that is associated with the action or task that the user is trying to perform. For instance, the action of accessing a bank account may require a greater degree of certainty in the verification result and thus may require a higher verification score than, e.g., accessing a social networking site. In some cases, if the verification score generated by the user's verification model(s) is below the appropriate threshold, the computing device can attempt to collect additional verification input, which may require additional (possibly structured) interaction with the user.

Further, since the compute/memory/storage resources of the user's computing device may be limited, in certain embodiments the data and/or algorithmic processing needed to carry out the techniques of the present invention may be performed remotely (e.g., in the cloud), or via a combination of local (e.g., device-based) and remote (e.g., cloud-based) resources.

The foregoing and other aspects of the present invention are described in further detail in the sections that follow.

2. System Environment

FIG. 1 depicts a system environment 100 that supports unobtrusive verification of user identity according to an embodiment. As shown, system environment 100 includes a computing device 104 that is operated by a user 102. Computing device 104 can be any conventional computing device known in the art, and in a particular embodiment can be a mobile/handheld device, such as a smartphone, tablet, PDA, or the like. System environment 100 further includes a storage component 106 that is communicatively coupled with computing device 104. Storage component 106 can be a component that is located remotely from computing device 104 (such as a networked storage array) or locally attached to/enclosed within computing device 104 (such as a commodity magnetic or solid-state hard disk).

In the example of FIG. 1, it is assumed that computing device 104 includes certain resources (e.g., applications, data, etc.) and/or is capable of performing certain tasks that should not be made available to all end-users; instead, these resources and tasks should only be accessible to user 102 (and other known users/owners of device 104). Accordingly, computing device 104 needs some mechanism for verifying the identities of users that attempt to operate/access the device. However, as noted in the Background section, existing user verification approaches suffer from a number of drawbacks (e.g., require structured interaction with users for each verification attempt, rely on a single verification model, etc.).

To address the foregoing and other similar issues, computing device 104 of FIG. 1 includes a novel verification model creation/update component 108 and a novel verification component 110. As detailed below, components 108 and 110 can enable computing device 104 to (1) create an initial verification model for user 102 using, e.g., an explicit or implicit enrollment process; (2) identify and collect (via data collection component(s) 112) reliable data streams from user 102 as he/she interacts with computing device 104; (3) unobtrusively create/update verification models 114 for user 102 based on the reliable data streams; and (4) unobtrusively verify the identity of user 102 using the verification models. In certain embodiments, as part of step (4), verification component 110 can take into account verification criteria 116 that are tied to a particular task, application, piece of data, or other entity that requires user verification. Further, model creation/update component 108 can continuously refine and update verification models 114 discreetly (i.e., without structured enrollment) as user 102 interacts with computing device 104. With this novel approach, computing device 104 can implement user verification in a manner that is more effective and nonintrusive than prior art solutions.

3. Initial Verification Model Creation

Figure 2:
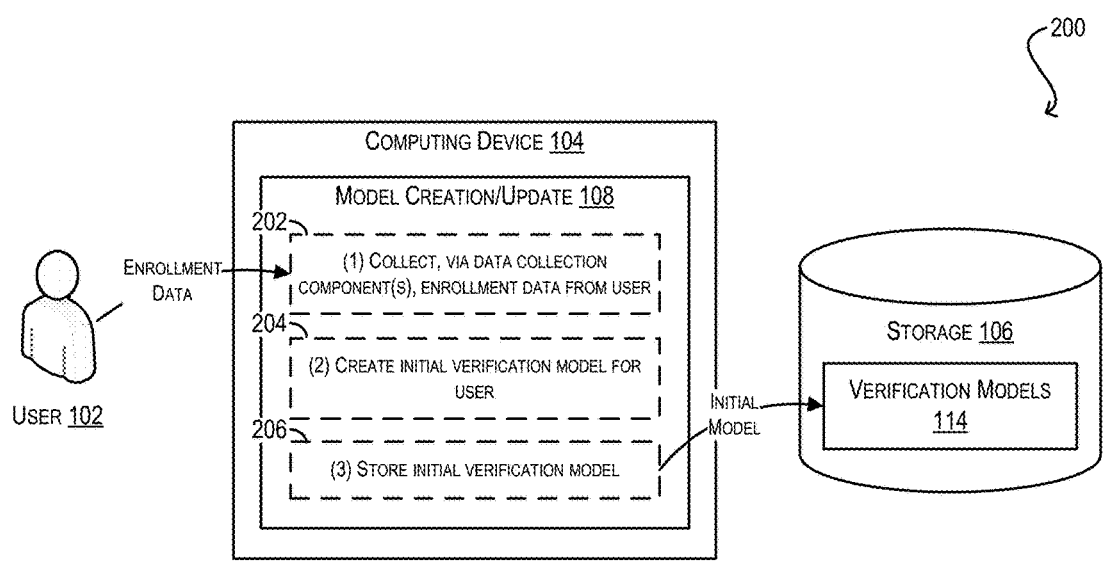
FIG. 2 depicts a workflow within the system environment of FIG. 1 for creating an initial verification model for a user according to an embodiment.

FIG. 2 depicts a high-level workflow 200 that can be performed by computing device 104 for creating an initial verification model for user 102 according to an embodiment. As discussed with respect to FIGS. 5-7 below, this initial verification model can be used as the basis for identifying future, reliable data streams from user 102.

Starting with step (1) (reference numeral 202), computing device 104 can collect, via data collection component(s) 112, enrollment data from user 102 for enrolling his/her identity with computing device 104. For example, the enrollment data can include speech samples collected via a microphone of device 104, photos collected via a camera of device 104, location data collected via a GPS system of device 104, device motion data collected via motion sensors (e.g., accelerometer, gyroscope, etc.) of device 104, fingerprints collected via a fingerprint reader of device 104, and so on. In one embodiment, the enrollment data can be collected explicitly via a structured enrollment process. In another embodiment, the enrollment data can be collected implicitly by, e.g., classifying user 102's behavior/inputs as he/she normally interacts with computing device 104.

At step (2) (reference numeral 204), model creation/update component 108 of computing device 104 can create an initial verification model for user 102 based on the enrollment data collected at step (1). As used herein, the term "verification model" refers to a set of data and algorithms capable of verifying the identity of a user. Examples of verification models include a speech-based speaker verification model, a vision-based face verification model, a fingerprint verification model, a retina verification model, a location-based verification model, a device motion-based verification model, and so on.

Once the initial verification model has been created, model creation/update component 108 can store the model in storage component 106 for future use (step (3), reference numeral 206).

Figure 3:
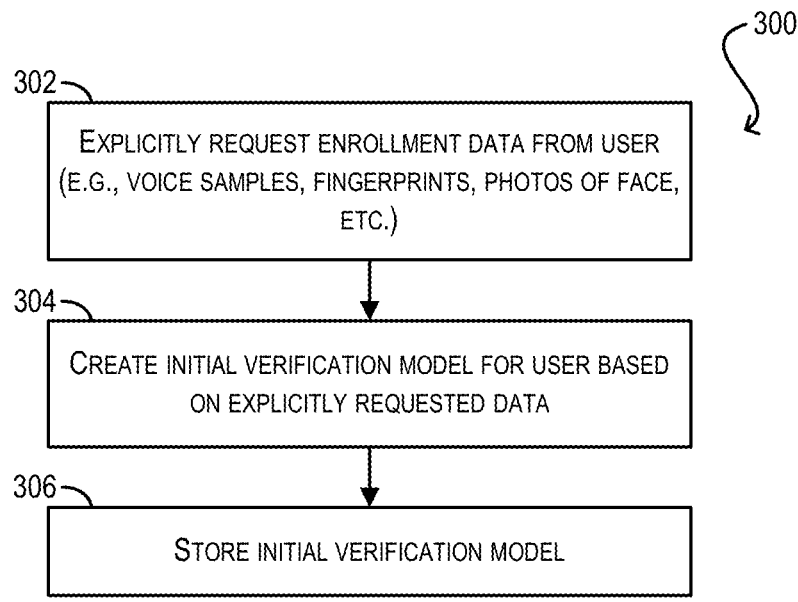
FIGS. 3 and 4 depict flowcharts for carrying out the workflow of FIG. 2 according to an embodiment.

As noted above, the task of collecting enrollment data for the initial verification model (at step (1) of workflow 200) can be carried out either explicitly or implicitly. FIG. 3 depicts a flowchart 300 for collecting such data using a structured enrollment process according to an embodiment.

At block 302, computing device 104 can explicitly request enrollment data from user 102. For example, in one embodiment, computing device 104 can instruct user 102 to say a specific phrase (e.g., "this is my voice") a certain number of times. In another embodiment, computing device 104 can instruct user 102 to look at the device's camera so that the device can take one or more photos of the user's face. In yet another embodiment, computing device 104 can instruct user 102 to place his/her finger on the device's fingerprint reader.

At block 304, model creation/update component 108 can create an initial verification model based on the data that is explicitly requested and collected at block 302. Component 108 can then store the created model in storage component 106 (block 306).

Figure 4:
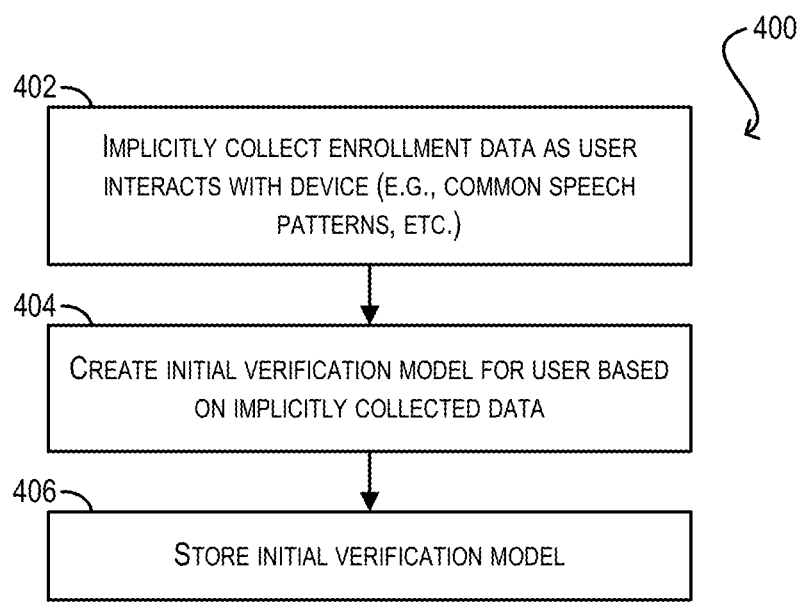

In contrast to FIG. 3, FIG. 4 depicts a flowchart 400 for creating the initial verification model via an implicit enrollment process according to an embodiment. At block 402, computing device 104 can implicitly (i.e., without structured enrollment) collect data from user 102 by tracking common interactions that user 102 has with device 104. For instance, assume computing device 104 accepts the speech pattern "OK device, check my e-mail" for waking up the device and downloading/presenting new e-mails. In this scenario, computing device 104 can identify this use case and record the speech pattern each time it is uttered.

At block 404, model creation/update component 108 can create an initial verification model for user 102 based on the implicitly collected data. For instance, returning to the example above, when user 102 utters "OK device, check my e-mail," component 108 can determine whether the uttered speech is sufficiently similar to an existing speaker verification model and, if not (indicating that this user has not yet been identified/enrolled), component 108 can create a new verification model for the user based on the collected speech data. Note that as more and more user interaction data is collected, users can be clustered into different verification models in this manner, without any need for structured enrollment.

Finally, at block 406, model creation/update component 108 can save the implicitly created verification model in storage component 106 (block 406).

When comparing the embodiments of FIG. 3 and FIG. 4, the explicit enrollment approach has the advantage of establishing an initial verification model that can more reliably identify the target user (i.e., user 102), with the disadvantage of requiring the user to follow a structured enrollment process. Conversely, the implicit enrollment approach does not require structured enrollment, but has the disadvantage of establishing a potentially less reliable initial verification model.

4. Unobtrusively Creating/Updating Additional Verification Models

Although the creation of an initial verification model is an important first step in facilitating unobtrusive user verification, this initial model alone is generally not sufficient because the goal of unobtrusive verification is to verify a user's identity without requiring the user to provide the exact security metadata submitted at the time of enrollment. Thus, in certain embodiments, the techniques of the present invention further comprise collecting additional, reliable data streams from an enrolled user, which can be used to unobtrusively create/update additional verification models. As used herein, a "reliable" data stream is a data stream that is highly correlated with an enrolled user's presence, either because the user has been verified via, e.g., the initial verification model, or has been identified via a common usage pattern. The additional verification models can then be applied (in addition to, or in lieu of, the initial verification model) at the time of verification in order to accurately verify the user's identity, without needing explicit verification input from the user.

In one embodiment, the additional verification models that are created from the reliable data streams can operate on the same general type of data as the initial verification model. For example, if the initial verification model is a text-dependent speaker model, one additional verification model can be a text-independent speaker model. In other embodiments, the additional verification models can operate on completely different types of data (e.g., photos, fingerprints, handprints, GPS coordinates, time of day, device motion, etc.).

Figure 5:
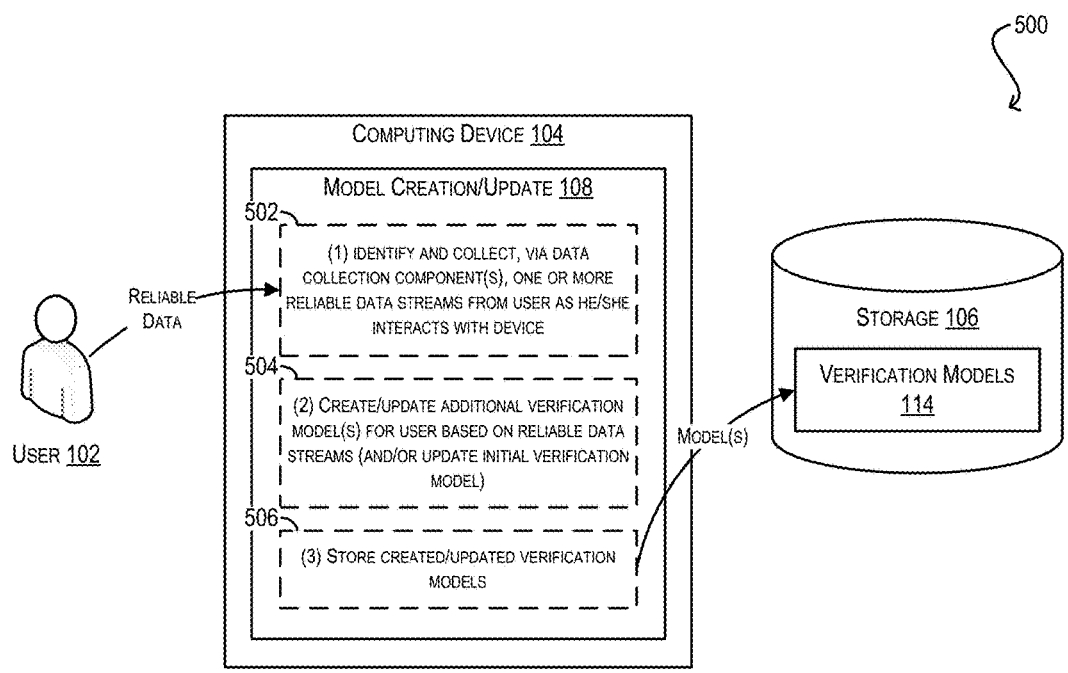
FIG. 5 depicts a workflow within the system environment of FIG. 1 for unobtrusively creating additional verification models (or updating existing verification models) for a user according to an embodiment.

FIG. 5 depicts a high-level workflow 500 for unobtrusively creating/updating additional verification models for an enrolled user of a computing device (e.g., user 102 of device 104) according to an embodiment. Workflow 500 assumes that workflow 200 of FIG. 2 has already been (or is concurrently being) executed.

Starting with step (1) (reference numeral 502), computing device 104 can identify and collect, via its data collection component(s) 112, one or more reliable data streams from user 102 as he/she interacts with computing device 104. As noted previously, a reliable data stream is a data stream that is highly correlated with a particular user's presence, and thus can be deemed to have likely originated from that user. In embodiments where user 102 participates in a structured enrollment process, step (1) can comprise collecting data streams during, or proximate to, the enrollment process (described with respect to FIG. 6 below). In other embodiments, step (1) can comprise collecting data streams at around the time user 102 is verified via the initial verification model, or identified via a clustering algorithm (described with respect to FIG. 7 below). Generally speaking, this collection step can be performed in a manner that is transparent to user 102. Thus, user 102 can be completely unaware that any additional data is being collected for the purpose of generating further verification models.

At step (2) (reference numeral 504), model creation/update component 108 can create additional verification models for user 102 based on the reliable data streams collected at step (1). In addition or as an alternative, model creation/update component 108 can also update user 102's initial verification model. As noted previously, the additional verification models can operate on the same general type of data as the initial verification model, or may be different types of models that operate on different types of data.

Once the additional verification models have been created, model creation/update component 108 can store the verification models in storage component 106 for future use by verification component 110 (step (3), reference numeral 506). Further, although not shown, component 108 can repeat steps (1)-(3) on a periodic basis (e.g., as additional reliable data streams become available) in order to update the verification models created at step (2), and/or to create new verification models.

Figure 6:
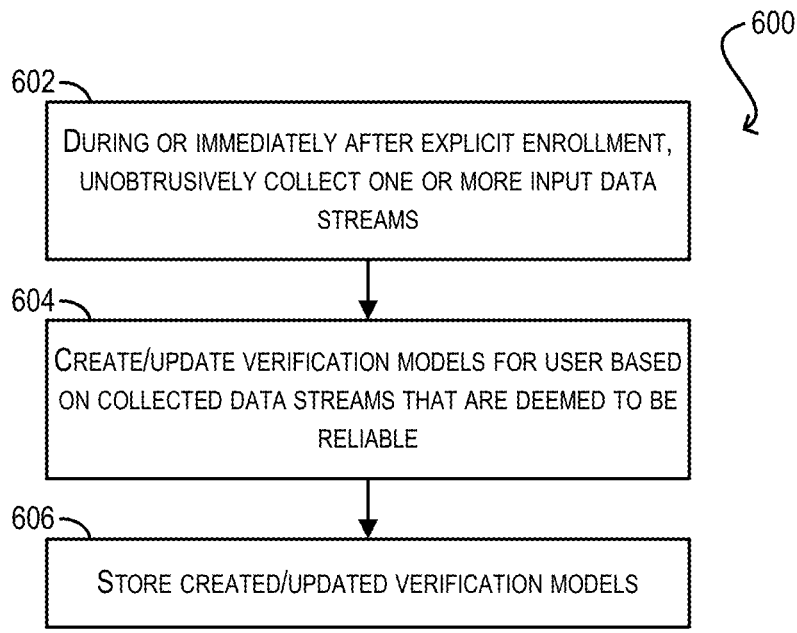
FIGS. 6 and 7 depict flowcharts for carrying out the workflow of FIG. 5 according to an embodiment.

FIG. 6 depicts a flowchart 600 for implementing workflow 500 of FIG. 5 in the context of a structured enrollment process according to an embodiment. Since the presence of the enrolled user (e.g., user 102) is nearly guaranteed while the enrollment process is being carried out, this is an optimal time period for collecting additional reliable data from the user.

At block 602, computing device 104 can collect, either during or immediately before/after the structured enrollment process, one or more input data streams. As one example, if the enrollment process involves recording a specific speech phrase, component 108 can cause computing device 104 to record additional speech data for some period of time immediately following this process. As other examples, computing 108 can cause device 104 to, e.g., capture images, record device location, record device motion, and so on during the enrollment process.

At block 604, model creation/update component 108 can create or update additional verification models for user 102 based on the data streams collected at block 602 that are deemed to be reliable (i.e., are likely to have originated from user 102). For instance, in the scenario where speech data is recorded immediately following the enrollment process, component 108 can extract speech from the recorded data, segment the speech according to spectral and/or prosodic characteristics, and use the speech segments from the user that is most similar to the enrolled speech phrase (i.e., user 102) as enrollment data for a text-independent speaker verification model. Alternatively, in the scenario where images/photos are captured during the enrollment process, component 108 can determine whether a face is present in the images and, if so, can use the images to enroll a face verification model for user 102.

Finally, at block 606, model creation/update component 108 can store the created/updated verification models in storage component 106.

Figure 7:
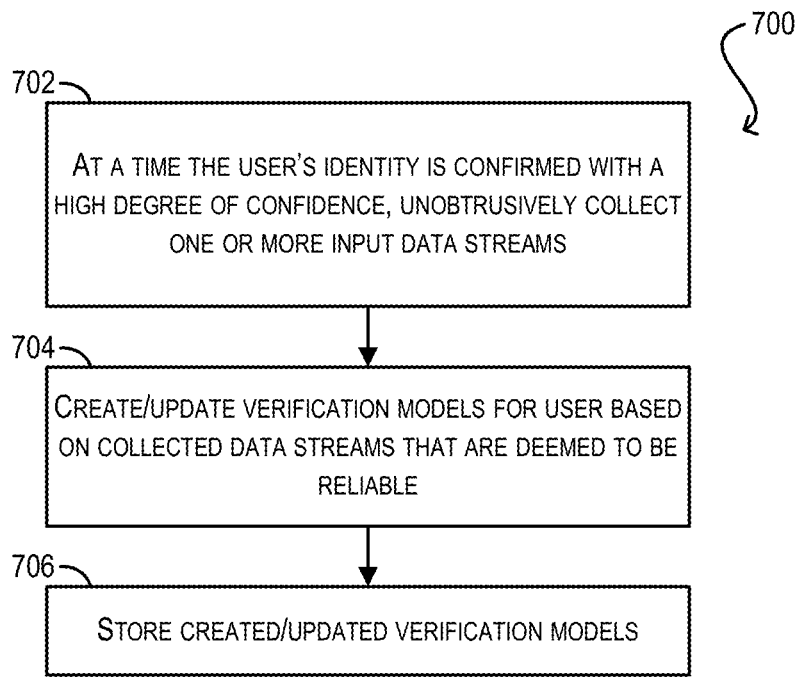

FIG. 7 depicts a flowchart 700 for implementing workflow 500 of FIG. 5 at a time user 102's identity is verified (via, e.g., the user's initial verification model) or otherwise identified according to an embodiment. Flowchart 700 can be used as an alternative to flowchart 600 of FIG. 6 for collecting reliable data streams and creating/updating additional verification models in cases where these is no structured enrollment process. Flowchart 700 can also be used to refine/update additional verification models that have already been created via flowchart 600.

At block 702, computing device 104 can, at a time user 102's identity has been confirmed with a high degree of confidence, unobtrusively collect one or more input data streams (e.g., audio, images, GPS coordinates, device motion, etc.). As mentioned above, this may be at a time user 102 is explicitly verified using the initial verification model created per FIG. 2. Alternatively, this may be at a time the user is identified via, e.g., a user clustering algorithm. In certain embodiments, the threshold for "high degree of confidence" may be determined empirically. If the threshold is set too high, then very little new data will be collected for enrolling additional verification models. On the other hand, if the threshold is set too low, then imposter data or noise may be incorrectly used for enrollment. It is assumed that model creation/update component 108 is robust to a small amount of non-target/imposter data, as long as the amount of target data is sufficient.

Then, at blocks 704 and 706, model creation/update component 108 can create or update additional verification models for user 102 based on the data collected at block 702 and can store the created/updated models in a manner similar to blocks 604 and 606 of FIG. 6.

5. Unobtrusively Verifying the Identity of a User

Once one or more verification models have been established for a given user, the techniques of the present invention can use these models to verify, in an unobtrusive manner, the identity of the user for certain tasks or transactions performed on his/her computing device, or in a continuous manner. In this way, the techniques can ensure that those tasks/transactions (or the device is general) is secured, while avoiding the need to solicit explicit "identifying" information from the user for verification purposes.

Figure 8:
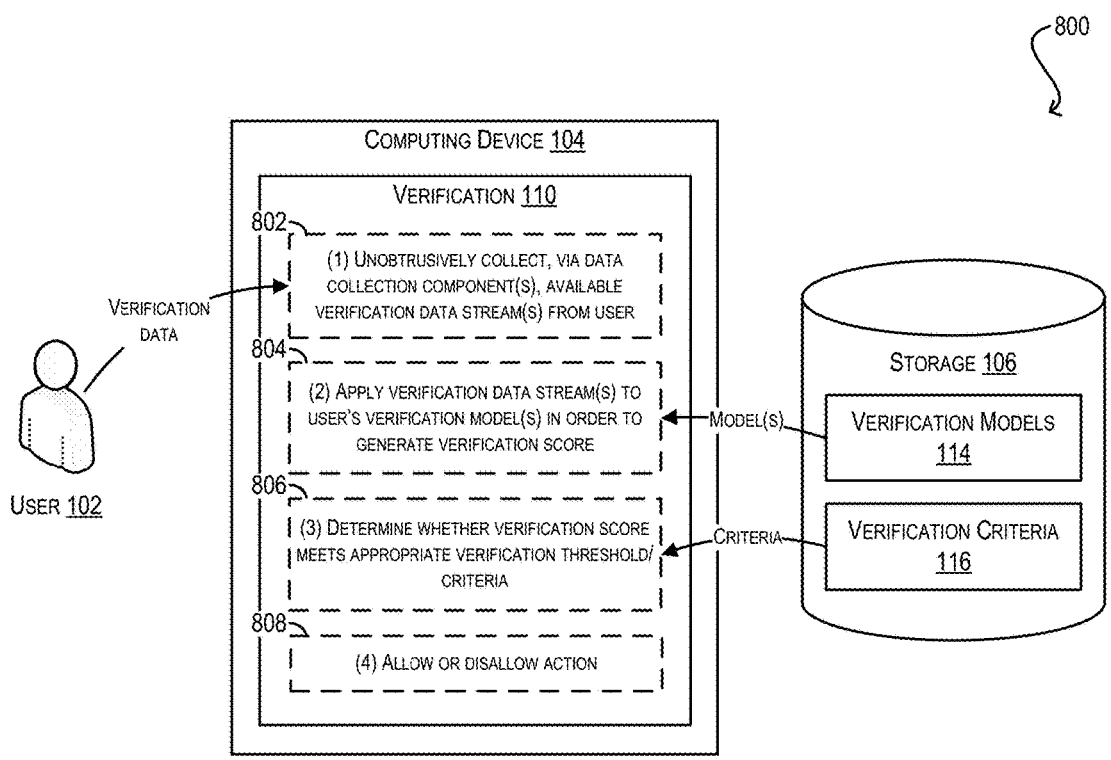
FIG. 8 depicts a workflow within the system environment of FIG. 1 for unobtrusively verifying the identity of a user according to an embodiment.

FIG. 8 depicts a high-level workflow 800 for unobtrusively verifying the identity of a user of a computing device (e.g., user 102 of device 104) according to an embodiment. Workflow 800 assumes that workflows 200 and 500 have been (or are concurrently being) executed.

Starting with step (1) (reference numeral 802), verification component 110 of computing device 104 can unobtrusively collect, via data collection component(s) 112, verification data streams that are available from user 102. For example, verification component 100 may discreetly record speech data, capture images via device 104's camera, collect GPS coordinates, sense device motion, and/or the like. Note that since this step is performed in an unobtrusive manner, user 102 may be unaware that device 104 is collecting information for verification purposes.

At step (2) (reference numeral 804), verification component 110 can apply the verification data streams collected at block 802 to the verification models that have been created for user 102. For instance, verification component can apply recorded speech data to a text-dependent or text-independent speaker verification model, apply captured images to a face verification model, apply location information to a location-based verification model, and so on.

The end result of step (2) is a verification score that indicates whether user 102 has been verified as an enrolled user of computing device 104. In cases where multiple verification models are applied, verification component 110 can combine the outputs of the various models to generate the final verification score. Component 110 can use one or more standard techniques to perform such data combination, such as Bayes' rule, neural networks, Dempster-Shafer theory, and/or non-parametric information fusion. These techniques can take into account factors that may affect the accuracy of each verification model, such as the amount of verification data collected for each model, environmental conditions, etc.

At step (3) (reference numeral 806), verification component 110 can determine whether the verification score meets an appropriate verification threshold or set of criteria (shown as criteria 116). This threshold/criteria may depend on a combination of the task/application being performed (e.g. banking, social networking, unlocking the device, etc.) and user 102's preferences. If the verification score determined at step (2) does not meet the required threshold, the verification component 110 can explicitly ask user 102 for additional verification input (e.g., "say the phrase 'this is my voice' to continue").

Finally, verification component 110 can allow or disallow the desired action based on the outcome of step (3) (step (4), reference numeral 808).

To provide a tangible example of workflow 800, assume user 102 typically launches the application "Facebook" on computing device 104 via voice trigger (e.g., "open Facebook"). Further assume that Facebook requires, as part of its configured security policy, verification that the user launching the application is a registered/enrolled user of device 104. In this scenario, verification component 110 can collect the voice trigger phrase, while at the same time capturing images of user 102's face and recording the device's current location. Verification component 110 can then apply these various input streams to their corresponding verification models in order to determine whether the current user accessing computing device 104 is, in fact, an enrolled user, and thus is authorized to launch Facebook. Note that since user 102 is not explicitly asked to provide any identifying information for verification purposes, this verification process can be completely transparent to the user.

Figure 9:
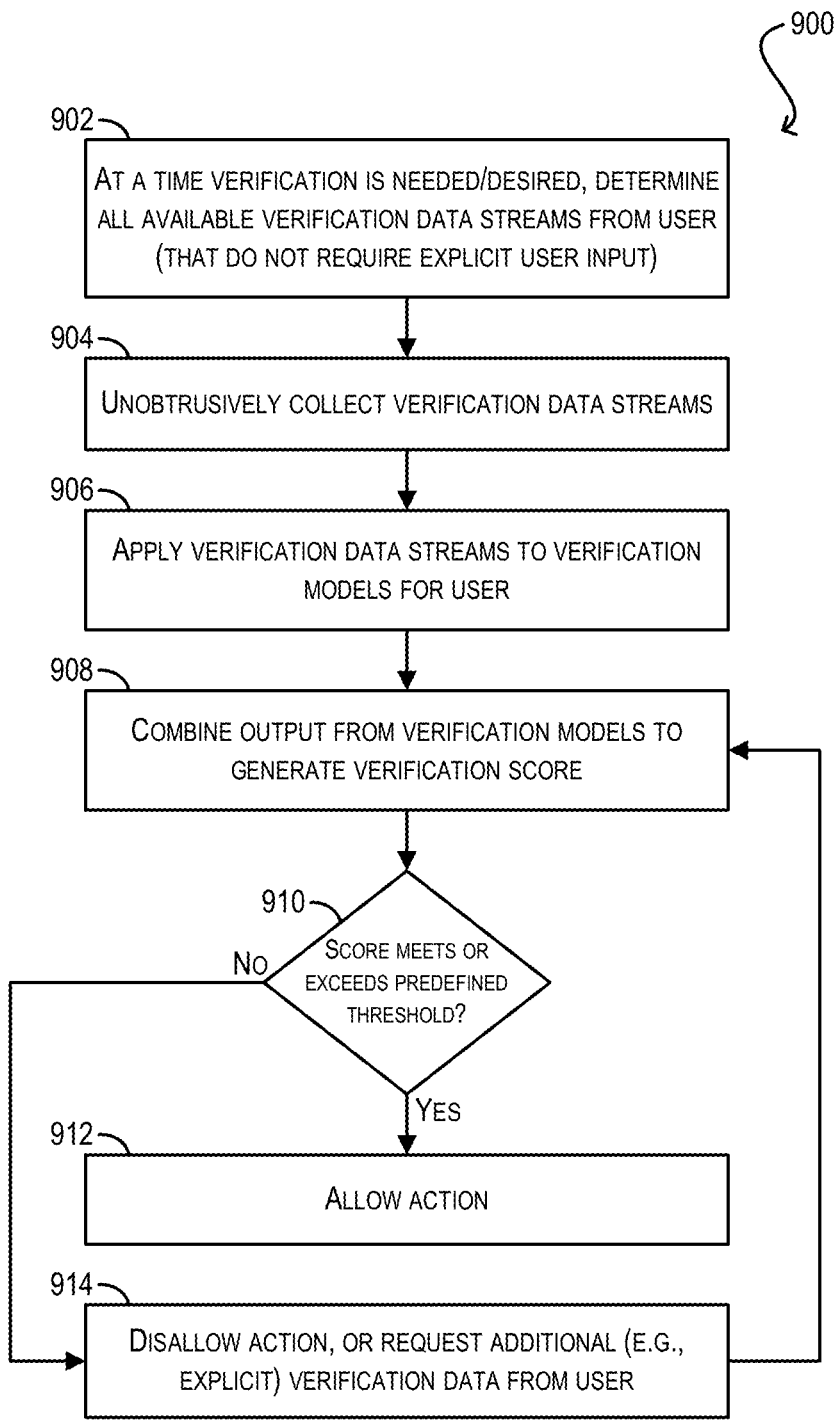
FIG. 9 depicts a flowchart for carrying out the workflow of FIG. 8 according to an embodiment.

FIG. 9 depicts a flowchart 900 that provides additional details regarding workflow 800 of FIG. 8 according to an embodiment. First, at a time verification is needed/desired, verification component 110 of computing device 104 can determine all verification data streams that are available for the current user of the device (that do not require explicit user input) (block 902). For example, verification component 110 can determine that an audio data stream is available, location data is available, etc.

At block 904, verification component 110 can unobtrusively collect the verification data streams determined at block 902. Verification component 110 can then apply the collected data streams to the verification models previously created for the user (block 906).

At blocks 908 and 910, verification component 110 can combine the output from the verification models to generate a verification score, and can compare the verification score to a threshold that has been defined for the action/task that requires verification. If the threshold is met or exceeded, verification component 110 can allow the action (block 912).

On the other hand, if the threshold is not met, verification component 110 can disallow the action, or request additional (e.g., explicit) verification data from the user (block 914). Verification component 110 can then return to block 908 to compute a new verification score, and steps 908-914 can repeat until the threshold is met or the action is ultimately disallowed.

6. Distribution of Resources

While the preceding sections have generally described the techniques of the present invention as being performed locally on computing device 104 (referred to as the client device), in certain embodiments some or all of the data and/or algorithmic processing needed to perform unobtrusive user verification may be offloaded to a remote location, such as a cloud-based server or server cluster. The server/server cluster may be a more powerful or distributed processing device that can process a large volume of data more quickly, and/or with less power consumption, than client computing device 104.

For example, in a particular embodiment, the enrollment data collected by computing device 104, and/or the verification models used for user verification, may be stored remotely on a cloud-based server. Data can be moved between computing device 104 and the server on an as-needed basis when a network connection is available. Further, in certain embodiments, the verification process may also be performed, either wholly or in part, on the server. The exact combination of client and server resources that are employed may vary depending on factors such as connectivity (e.g., if there is no connection, then verification is performed solely on the client) and desired accuracy. In cases where computing device 104 performs part of the verification processing and the server performs another part of the verification processing, the final verification score may be determined by combining information from both device 104 and server.

Beyond performance considerations, in some embodiments some or all of the data and/or processing performed by computing device 104 may be offloaded to a cloud-based server for enhanced security. For example, if a bank wishes to verify the identity of a user, the bank may require the user to initially visit a bank branch in person, present their photo ID, and enroll their speech and face in a highly structured manner. The verification model built from this speech and vision data can be stored on the bank's server, and the user's client computing device can be solely responsible for sending verification data to the banks server for processing. In this way, if the user's device is compromised, the model used for verification is not.

It is also possible to combine and/or compare verification results from the client computing device and a remote server for security purposes. For instance, in the bank example above, the bank may require verification by both a server instance of the user's verification model(s) and a client instance of the user's verification model(s). Further, the bank may check whether the server and client-side verification models are consistent with each other (e.g., generate similar results for parameters that measure the same information).

7. Exemplary Computing Device

Figure 10:
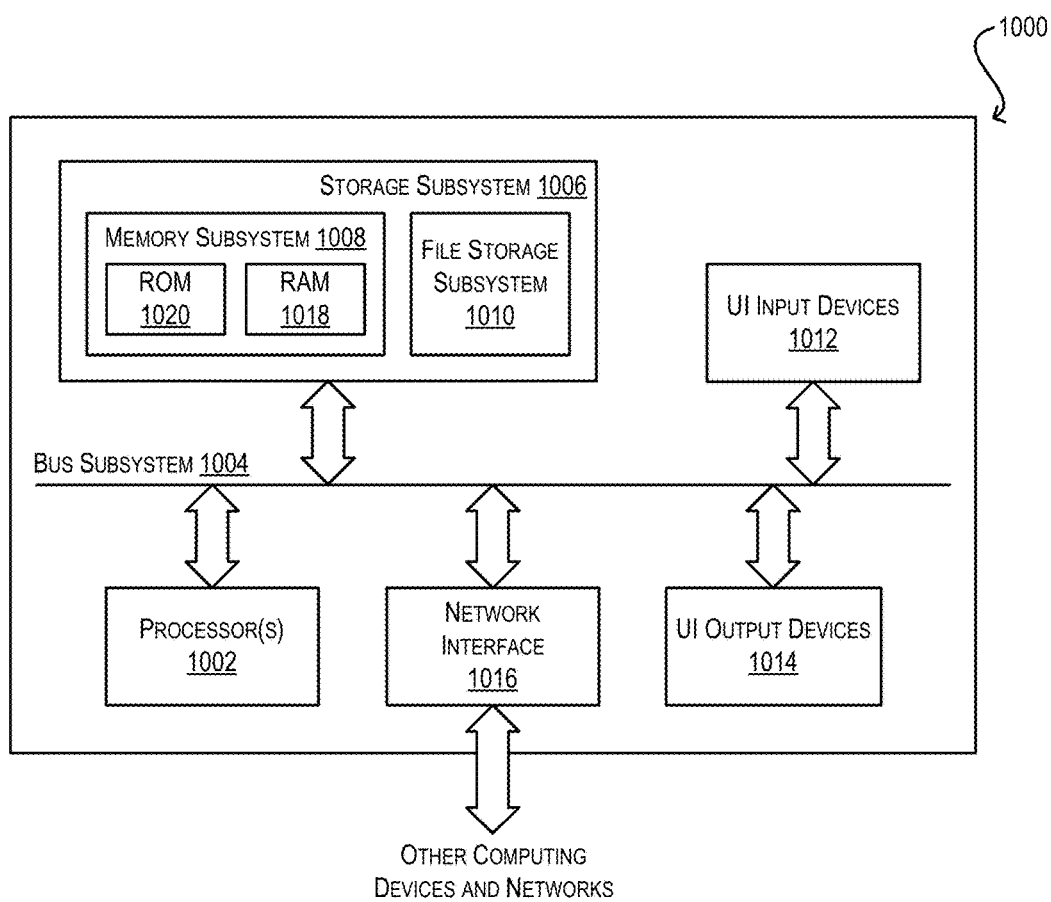
FIG. 10 depicts an exemplary computing device according to an embodiment.

FIG. 10 is a simplified block diagram of a computing device 1000 that may be used to implement computing device 104 of FIG. 1 according to an embodiment. Computing device 1000 can be, e.g., a smartphone, a tablet, a wearable device (e.g., a "smart" watch), a laptop or desktop system, or the like. As shown, computing device 1000 can include one or more processors 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computing device 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computing device 1000 and other computing devices or networks. Embodiments of network interface subsystem 1016 can include wired (e.g., coaxial, twisted pair, or fiber optic Ethernet) and/or wireless (e.g., Wi-Fi, cellular, Bluetooth, etc.) interfaces.

User interface input devices 1012 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 1000.

User interface output devices 1014 can include a display subsystem (e.g., a flat-panel display), an audio output device (e.g., a speaker), and/or the like. In general, use of the term "output device" is intended to include all possible types of devices and mechanisms for outputting information from computing device 1000.

Storage subsystem 1006 can include a memory subsystem 1008 and a file/disk storage subsystem 1010. Subsystems 1008 and 1010 represent non-transitory computer-readable storage media that can store program code and/or data that provide the functionality of various embodiments described herein.

Memory subsystem 1008 can include a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 1000 is illustrative and not intended to limit embodiments of the present invention. Many other configurations having more or fewer components than computing device 1000 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
creating, by a computing device, a first verification model for a user, the first verification model being based upon enrollment data that is collected via an explicit enrollment procedure and including a first set of biometric data for verifying an identity of the user;
verifying, by the computing device, the identity of the user a first time using the first verification model;
unobtrusively collecting, by the computing device, one or more reliable data streams associated with the user, wherein the one or more reliable data streams are collected while the identity of the user is verified the first time using the first verification model;
unobtrusively creating, by the computing device, a second verification model for the user, wherein the second verification model is based upon the one or more reliable data streams that are collected while the identity of the user is verified the first time using the first verification model, wherein the second verification model includes a second set of biometric data for verifying the identity of the user, and wherein the second set of biometric data included in the second verification model comprises biometric data of a different type than the first set of biometric data included in the first verification model;
unobtrusively collecting, by the computing device, one or more verification data streams from the user, the one or more verification data streams being separate from the enrollment data used to create the first verification model, and the one or more reliable data streams used to create the second verification model; and
verifying, by the computing device, the identity of the user a second time by applying the one or more verification data streams to the first and second verification models, wherein verifying the identity of the user the second time comprises:
receiving, by the computing device, a first verification result generated by a server remote from the computing device, the first verification result being generated by the server based on instances of the first and second verification models stored on the server;
comparing, by the computing device, the first verification result with a second verification result generated by the computing device based on instances of the first and second verification models stored on the computing device; and
if the first verification result generated by the server is consistent with the second verification result generated by the computing device, authorizing the user to perform a secured action on the computing device.

2. The method of claim 1 wherein the identity of the user is further verified on a continuous basis while the user is interacting with the computing device.

3. The method of claim 1 wherein the verifying the identity of the user the second time is also performed in a manner that is unobtrusive to the user.

4. The method of claim 1 wherein the first and second verification models are unobtrusively updated on a periodic basis based upon additional reliable data streams that are identified during the computing device's runtime operation.

5. The method of claim 1 wherein the different types of user verification data include acoustic data, visual data, location data, and motion data.

6. The method of claim 1 wherein the first and second verification models are selected from a group consisting of: a voice-based verification model, a face-based verification model, a location-based verification model, a motion-based verification model, a retina-based verification model, a fingerprint-based verification model, and a handprint-based verification model.

7. The method of claim 1 wherein verifying the identity of the user the second time by applying the one or more verification data streams to the first and second verification models further comprises:
generating, based on the applying, a verification score.

8. The method of claim 7 wherein generating the verification score comprises:
combining output from the first and second verification models.

9. The method of claim 8 wherein combining output from the first and second verification models comprises:
assigning a weight to the output of each verification model based one or more criteria.

10. The method of claim 7 wherein verifying the identity of the user the second time by applying the one or more verification data streams to the first and second verification models further comprises:
determining whether the verification score meets or exceeds a predefined threshold; and
if the verification score does not meet or exceed the predefined threshold, asking the user to provide explicit verification input.

11. The method of claim 10 wherein the predefined threshold is associated with an application or task that the user is attempting to run or perform.

12. A non-transitory computer readable medium having stored thereon program code executable by a processor of a computing device, the program code comprising:
code that causes the processor to create a first verification model for a user, the first verification model being based upon enrollment data that is collected via an explicit enrollment procedure and including a first set of biometric data for verifying an identity of the user;
code that causes the processor to verify the identity of the user a first time using the first verification model;
code that causes the processor to unobtrusively collect one or more reliable data streams associated with the user, wherein the one or more reliable data streams are collected while the identity of the user is verified the first time using the first verification model;
code that causes the processor to unobtrusively create a second verification model for the user, wherein the second verification model is based upon the one or more reliable data streams that are collected while the identity of the user is verified the first time using the first verification model, wherein the second verification model includes a second set of biometric data for verifying the identity of the user, and wherein the second set of biometric data included in the second verification model comprises biometric data of a different type than the first set of biometric data included in the first verification model;
code that causes the processor to unobtrusively collect one or more verification data streams from the user, the one or more verification data streams being separate from the enrollment data used to create the first verification model and the one or more reliable data streams used to create the second verification model; and
code that causes the processor to verify the identity of the user a second time by applying the one or more verification data streams to the first and second verification models wherein verifying the identity of the user the second time comprises:
receiving, by the processor, a first verification result generated by a server remote from the computing device, the first verification result being generated by the server based on instances of the first and second verification models stored on the server;
comparing, by the processor, the first verification result with a second verification result generated by the processor based on instances of the first and second verification models stored on the computing device; and
if the first verification result generated by the server is consistent with the second verification result generated by the processor, authorizing the user to perform a secured action on the computing device.

13. A computing device comprising:
a processor; and
a non-transitory computer readable medium having stored thereon executable program code which, when executed by the processor, causes the processor to:
create a first verification model for a user, the first verification model being based upon enrollment data that is collected via an explicit enrollment procedure and including a first set of biometric data for verifying an identity of the user;
verify the identity of the user a first time using the first verification model;
unobtrusively collect one or more reliable data streams associated with the user, wherein the one or more reliable data streams are collected while the identity of the user is verified the first time using the first verification model;
unobtrusively create a second verification model for the user, wherein the second verification model is based upon the one or more reliable data streams that are collected while the identity of the user is verified the first time using the first verification model, wherein the second verification model includes a second set of biometric data for verifying the identity of the user, and wherein the second set of biometric data included in the second verification model comprises biometric data of a different type than the first set of biometric data included in the first verification model;
unobtrusively collect one or more verification data streams from the user, the one or more verification data streams being separate from the enrollment data used to create the first verification model and the one or more reliable data streams used to create the second verification model; and
verify the identity of the user a second time by applying the one or more verification data streams to the first and second verification models, wherein verifying the identity of the user the second time comprises:
receiving a first verification result generated by a server remote from the computing device, the first verification result being generated by the server based on instances of the first and second verification models stored on the server;

comparing the first verification result with a second verification result generated by the computing device based on instances of the first and second verification models stored on the computing device; and if the first verification result generated by the server is consistent with the second verification result generated by the computing device, authorizing the user to perform a secured action on the computing device.

* * * * *